Jan. 5, 1971 W. B. ELMER 3,553,644
VEHICLE REARWARD FLASHING LIGHT WHEN VISIBILITY POOR
Filed Aug. 23, 1967

INVENTOR.
WILLIAM B. ELMER
BY Wolf, Greenfield & Hieken
ATTORNEYS

United States Patent Office 3,553,644
Patented Jan. 5, 1971

3,553,644
VEHICLE REARWARD FLASHING LIGHT WHEN VISIBILITY POOR
William B. Elmer, 113 Pinckney St., Thornton, N.H. 02114
Filed Aug. 23, 1967, Ser. No. 662,710
Int. Cl. B60q 1/22, 1/46
U.S. Cl. 340—55                    2 Claims

ABSTRACT OF THE DISCLOSURE

The backup light of an automobile is flashed intermittently during periods of low visibility while this condition is also indicated by a flashing signal visible to the driver.

BACKGROUND OF THE INVENTION

The present invention relates in general to enhancing the visibility of a vehicle during fog or other low visibility conditions and more particularly concerns novel apparatus and techniques in which the backup light of a vehicle may perform the additional function of materially enhancing the visibility of the vehicle during fog or other conditions of poor visibility by being flashed while the vehicle is moving forward.

That guidance in fog on turnpikes is a serious problem is evident from the paper presented at the National Technical Conference of the Illuminating Engineering Society during Aug. 29 to Sept. 2, 1965 by D. E. Spencer, a Fellow of the Society and Robert E. Levin, a member of the society. They listed the following four courses of action to combat the fog problem:

(1) Dissipate the fog.
(2) Close the turnpike whenever fog occurs.
(3) Illuminate the entire roadway through the fog.
(4) Guide traffic through the fog.

After noting the lack of a practical method for dissipating fog, the unsatisfactory approach of closing the turnpike and the excessive cost involved in illuminating the entire roadway through the fog, the authors propose a guidance system involving embedding flashing lights along each of the white lines that delineate the traffic lanes associated with fog detectors that cause the embedded lights to flash when fog is sensed in the roadway portion ahead. However effective this costly proposal may be on a turnpike thus equipped, it is apparent that an automobile leaving the turnpike during conditions of low visibility will still have problems in determining the presence of a car ahead. Moreover, the effectiveness of such an embedded system would likely be seriously impaired when a layer of snow covers the roadway during a heavy snowstorm.

Accordingly, it is an important object of this invention to facilitate vehicle movement during periods of low visibility.

It is another object of the invention to achieve the preceding object by providing means for enhancing the visibility of a moving vehicle to the vehicles behind.

It is still a further object of the invention to achieve the preceding objects economically and reliably through the use of a large number of elements now common to most vehicles.

SUMMARY OF THE INVENTION

According to the invention, a pair of low bright lights, typically the existing backup lights of an automobile, are flashed during periods of low visibility while the vehicle is moving forward. Preferably, means are also provided for indicating the flashing to the driver of the vehicle to assure him that the visibility enhancing system is operative.

Numerous other features, objects and advantages of the invention will become apparent from the following specification when read in connection with the accompanying drawing in which:

DETAILED DESCRIPTION OF PREFERRED EMBODIMENTS

Figure 1:
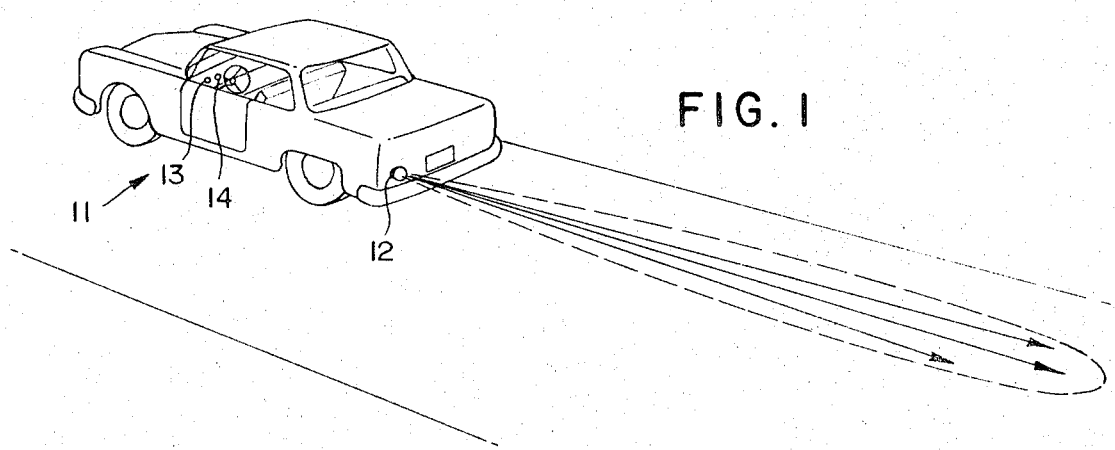
FIG. 1 illustrates one embodiment of the invention showing a motor vehicle provided with a low powerful rearwardly directed flashing light.

With reference now to the drawing and more particularly FIG. 1 thereof there is shown a motor vehicle 11 provided with a powerful rearwardly directed light 12. The instrument panel includes a control switch 13 for effecting flashing of the rearwardly directed light 12 while the vehicle is moving under conditions of low visibility. Optionally and preferably the instrument panel also includes a pilot light 14 that is easily visible and accessible to the driver that flashes with each flash of the rearwardly directed light 12 with sufficient intensity so that the driver knows the visibility enhancing system is operating properly, but not bright enough to disturb the driver.

Figure 2:
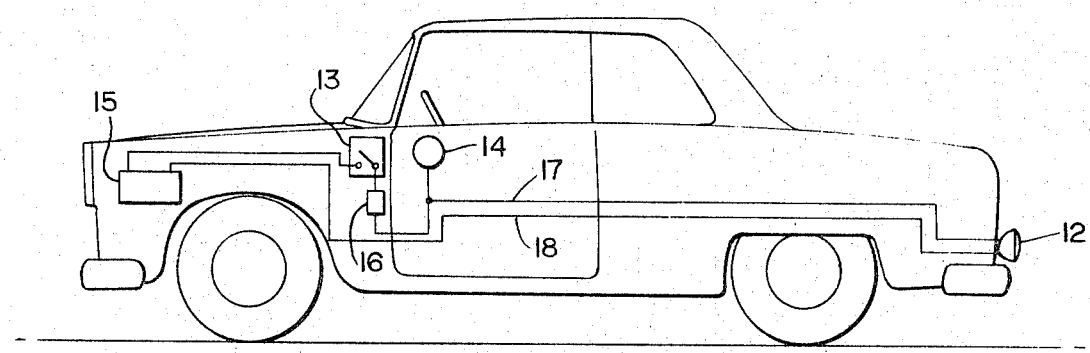
FIG. 2 shows in simplified schematic form the electrical circuitry supplied from the existing battery of the vehicle for accomplishing flashing and an indication of flashing to the driver.

Referring to FIG. 2 there is shown in simplified schematic form an electrical circuit which receives power from the existing vehicle battery 15. A manual control switch 13 establishes the electrical connection through wires 17, 18 to the powerful rearwardly directed light 12 at the rear of the vehicle. The electrical energy passes through flash controller 16 to cause periodic energization of light 12 and the consequent flashing. The optional pilot light 14 is also shown connected across the supply circuit to the powerful rear light 12 so that pilot light 14 flashes synchronously with the flashing of light 12.

Figure 3:
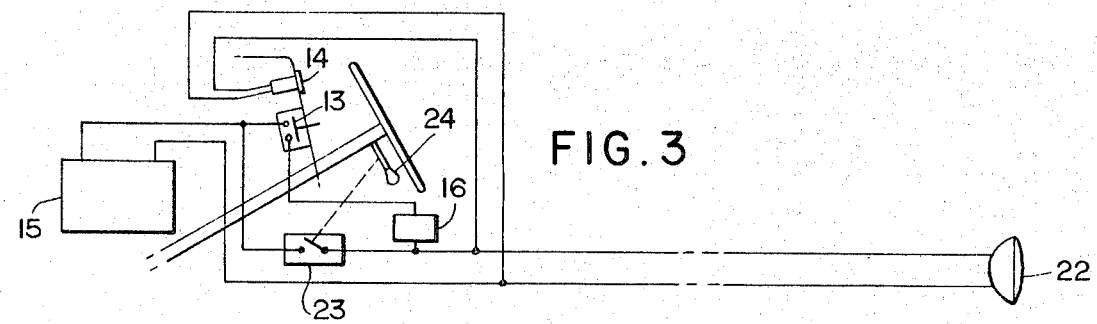
FIG. 3 is a diagrammatic representation showing the wiring for a vehicle with existing backup lights but no flasher.

Referring to FIG. 3 there is shown a diagrammatic representation of the wiring for a vehicle with an existing backup light 22 (or pair of backup lights) and a backup light switch 23 actuated by gear shift lever 24 so arranged that there is an added flashing controller 16 in series with battery 15 and control switch 13 to cause backup light 22 to flash when switch 13 is closed during conditions of poor visibility.

Figure 4:
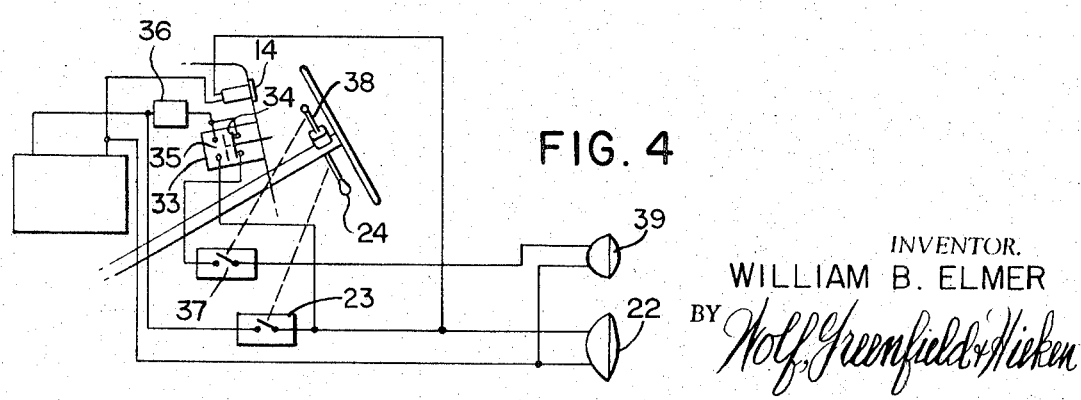
FIG. 4 is an especially advantageous embodiment of the invention showing a diagrammatic representation of the wiring for a vehicle with both backup lights and directional signals that utilizes both the existing backup light and the existing flasher performing dual functions.

Referring to FIG. 4, there is shown a diagrammatic representation of the wiring for a vehicle that has both backup lights and directional signals so that the directional signal flasher may be used to flash backup light 22. To this end a control switch 33 comprises a single-pole double-throw switch with contacts 34 normally closed and contacts 35 normally open so that the existing flasher 36 may normally function when energized through the closing of directional signal switch 37 upon actuation of directional signal lever 38 to flash tail light 39.

When conditions of low visibility occur, control switch 33 is moved to open contacts 34 and close contacts 35 so that flasher 36 is then in series with battery 15 and backup light 22 to produce flashing. This arrangement is especially advantageous because the addition of but a single switch provides visibility enhancement according to the invention by allowing the existing flasher 36 and the existing backup light 22 to perform both their conventional functions and coact to perform an additional function of enhancing visibility to the rear.

The present invention thus represents a practical and economical solution to the problem of maintaining safe movement of vehicles at reasonable speed under conditions of low visibility. At negligible additional cost the invention may be incorporated in new vehicles being manufactured so that in a few years all vehicles will be so equipped. Then, each moving vehicle in a line of traffic functions as a beacon defining a safe path for all immediately succeeding vehicles so that heavily traveled highways need not become unduly clogged when a period of low visibility occurs during periods of heavy traffic. Use of the invention always assures the user that vehicles approaching from the rear will be adequately apprised of his presence.

There has been described an economical reliable system for enhancing the visibility of a vehicle to following vehicles during conditions of low visibility. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein described, and limited solely by the spirit and scope of the appended claims.

What is claimed is:

1. Apparatus for enhancing the visibility of a motor vehicle having at least a tail light means and backup light means and at least a first flashing means comprising,
   a source of electrical energy on said vehicle,
   directional signal switch means for selectively coupling energy from said source of electrical energy through said first flashing means to said tail light means,
   backup light switch means for continuously delivering energy from said source of electrical energy to said backup light means when said vehicle is conditioned to move in the reverse direction,
   and control switch means for selectively intercoupling said first flashing means and said directional signal switch means under normal conditions and for intercoupling said first flashing means and said backup light means during conditions of low visibility to then couple energy from said source of electrical energy to said backup light means through said first flashing means,
   whereby the said first flashing means that may be used to flash said tail light means may be used to flash said backup light means during conditions of low visibility.

2. Apparatus in accordance with claim 1 and further comprising,
   pilot light means intercoupling said backup light means and said source of electrical energy for providing an indication of when said backup light means is lit.

References Cited

UNITED STATES PATENTS

| | | | |
|---|---|---|---|
| 2,458,323 | 1/1949 | Yolker | 340—74 |
| 2,562,271 | 7/1951 | Hollins | 340—72X |
| 2,671,848 | 3/1954 | Swayne | 240—8.3X |
| 2,771,525 | 11/1956 | Sivak | 340—81(F)X |
| 2,878,462 | 3/1959 | Tralli | 340—81X |
| 2,911,620 | 11/1959 | Scherenberg | 340—81X |
| 3,283,301 | 11/1966 | Beasley | 340—72X |

FOREIGN PATENTS

| | | | |
|---|---|---|---|
| 1,011,796 | 4/1952 | France | 240—8.3 |
| 476,403 | 12/1937 | Great Britain | 340—75 |

THOMAS B. HABECKER, Primary Examiner

K. N. LEIMER, Assistant Examiner

U.S. Cl. X.R.

340—66, 70, 80, 81

UNITED STATES PATENT OFFICE
CERTIFICATE OF CORRECTION

Patent No. 3,553,644          Dated January 5, 1971

Inventor(s)  William B. Elmer

It is certified that error appears in the above-identified patent and that said Letters Patent are hereby corrected as shown below:

In the heading to the printed specification, lines 4 ar 5, "William B. Elmer, 113 Pinckney St., Thornton, N. H. 0211 should read -- William B. Elmer, Thornton, N. H. (113 Pinckr St., Boston, Mass. 02114). --.

Signed and sealed this 6th day of April 1971.

(SEAL)
Attest:

EDWARD M. FLETCHER, JR.                WILLIAM E. SCHUYLER,
Attesting Officer                        Commissioner of Pater